United States Patent
Crandall et al.

(10) Patent No.: US 8,099,591 B2
(45) Date of Patent: *Jan. 17, 2012

(54) TECHNIQUES AND GRAPHICAL USER INTERFACES FOR CATEGORICAL SHUFFLE

(75) Inventors: Richard Crandall, Portland, OR (US); Thomas Dowdy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 479 days.

This patent is subject to a terminal disclaimer.

(21) Appl. No.: 12/344,002

(22) Filed: Dec. 24, 2008

(65) Prior Publication Data

US 2009/0106658 A1 Apr. 23, 2009

Related U.S. Application Data

(63) Continuation of application No. 11/400,574, filed on Apr. 7, 2006, now Pat. No. 7,487,346.

(60) Provisional application No. 60/714,687, filed on Sep. 6, 2005.

(51) Int. Cl.
*G06F 1/24* (2006.01)
*G06F 9/00* (2006.01)

(52) U.S. Cl. ................... 713/100; 713/1; 713/2

(58) Field of Classification Search ............ 713/1, 2, 713/100; 369/30.08, 30.09
See application file for complete search history.

(56) References Cited

U.S. PATENT DOCUMENTS

| | | | |
|---|---|---|---|
| 6,031,797 | A | 2/2000 | Van Ryzin et al. |
| 6,526,411 | B1 | 2/2003 | Ward |
| 6,987,221 | B2 | 1/2006 | Platt |
| 7,126,581 | B2 | 10/2006 | Burk et al. |
| 7,487,346 | B2 | 2/2009 | Crandall et al. |
| 2002/0045960 | A1 | 4/2002 | Phillips et al. |
| 2002/0069412 | A1 | 6/2002 | Philips |
| 2006/0088292 | A1 | 4/2006 | Guillen et al. |
| 2006/0153040 | A1 | 7/2006 | Girish et al. |
| 2006/0155914 | A1 | 7/2006 | Jobs et al. |
| 2006/0288042 | A1 | 12/2006 | Hsieh et al. |
| 2008/0009268 | A1 | 1/2008 | Ramer et al. |

OTHER PUBLICATIONS

U.S. Appl. No. 11/400,574, filed Apr. 7, 2006.
Office Action for U.S. Appl. No. 11/400,574 mailed May 28, 2008.
Notice of Allowance for U.S. Appl. No. 11/400,574 mailed Nov. 18, 2008.
Supplemental Notice of Allowance for U.S. Appl. No. 11/400,574 mailed Dec. 10, 2008.

*Primary Examiner* — Nitin Patel (57) ABSTRACT

Improved techniques and graphical user interfaces that enable users to shuffle a group of media items in accordance with categories associated with the media items are disclosed. According to one aspect, techniques can operate to categorically shuffle media items having categories associated therewith. According to another aspect, a user interface control can be graphically presented to a user to assist the user in selecting a shuffle setting. The shuffle setting provided by the user affects the nature of the shuffle. For example, the shuffle setting can impact the likelihood that two adjacent media items in the group of media items will be from the same one or more categories following the shuffle.

22 Claims, 10 Drawing Sheets

TECHNIQUES AND GRAPHICAL USER INTERFACES FOR CATEGORICAL SHUFFLE

CROSS-REFERENCE TO RELATED APPLICATIONS

This application is a continuation of U.S. patent application Ser. No. 11/400,574, filed Apr. 7, 2006, and entitled "TECHNIQUES AND GRAPHICAL USER INTERFACES FOR CATEGORICAL SHUFFLE" (now U.S. Pat. No. 7,487,346), which is hereby incorporated by reference herein, and which in turn claims priority benefit of U.S. Provisional Patent Application No. 60/714,687, filed Sep. 6, 2005, and entitled "TECHNIQUES AND GRAPHICAL USER INTERFACES FOR CATEGORICAL SHUFFLE", which is hereby incorporated by reference herein.

This application is related to: (i) U.S. patent application Ser. No. 11/212,555, filed Aug. 24, 2005, and entitled "TECHNIQUES FOR IMPROVED PLAYLIST PROCESSING ON MEDIA DEVICES" (now U.S. Pat. No. 7,536,565), which is hereby incorporated by reference herein; and (ii) U.S. patent application Ser. No. 11/212,313, filed Aug. 24, 2005, and entitled "HIGHLY PORTABLE MEDIA DEVICE" (now U.S. Pat. No. 7,593,782), which is hereby incorporated herein by reference.

BACKGROUND OF THE INVENTION

1. Field of the Invention

The present invention relates to media management and, more particularly, to media management on computing devices.

2. Description of the Related Art

Conventionally, media management application programs operate on personal computers to facilitate storage and playback of media items, such as songs (music). One example of a media management application program is iTunes®, produced by Apple Computer, Inc. A media management application program typically enables its user to browse or search through a collection of songs (i.e., audio tracks) stored on a personal computer. A collection or group of songs can pertain to a library or playlist of songs. However, given the popularity of storage and playback of songs from personal computers, it is not uncommon that users store several thousand different songs on their personal computer.

Still further, a media management application can shuffle songs in a group of media items to reorder the songs. The shuffle operation can be at the request of a user or automatically initiated at the request of the media management application. Conventionally, however, the shuffle behavior is fixed. Namely, a conventional media management application program can perform a random shuffle operation. The random shuffle operation, however, yields statistically random results. As such, with the random shuffle operation, sporadically adjacent songs (i.e., audio tracks) will be from the same artist or album. However, some users desire that the shuffle operation avoid adjacent songs from the same artist or album. On the other hand, there are likely other users who desire that the shuffle operation occasionally yield adjacent songs that are from the same artist or album.

Accordingly, there is a need for improved techniques to provide shuffle operations for songs or other media items.

SUMMARY OF THE INVENTION

The invention pertains to techniques and graphical user interfaces that enable users to shuffle a group of media items in accordance with categories associated with the media items. According to one aspect, techniques can operate to categorically shuffle media items having categories associated therewith. According to another aspect, a user interface control can be graphically presented to a user to assist the user in selecting a shuffle setting. The shuffle setting provided by the user affects the nature of the shuffle. For example, the shuffle setting can impact the likelihood that two adjacent media items in the group of media items will be from the same one or more categories following the shuffle.

The invention can be implemented in numerous ways, including as a method, system, device, apparatus (including graphical user interface), or computer readable medium. Several embodiments of the invention are discussed below.

As a computer-implemented method operating on a computing system for shuffling media items in a group of media items, where the computing system has a display device and a user input device, one embodiment of the invention can, for example, include at least: displaying a user setting dialog screen on the display device, the user setting dialog screen including at least a user shuffle setting control for enabling a user to set a user shuffle setting; obtaining a user shuffle setting from the user via the user input device, the user shuffle setting determining whether repeats of the media items are more or less likely; determining a shuffle parameter based on the user shuffle setting; categorizing the media items within the group of media items; and categorically shuffling the categorized media items within the group of media items based on the shuffle parameter.

As a computing system for shuffling media items in a group of media items, one embodiment of the invention can, for example, include at least: means for obtaining a user shuffle setting provided by a user, the user shuffle setting determining whether repeats of the media items are more or less likely than random; means for determining a shuffle parameter based on the user shuffle setting; means for categorizing the media items within the group of media items; and means for categorically shuffling the categorized media items within the group.

As a computing system configured to shuffle media items in a group of media items, one embodiment of the invention can, for example, include at least: a display device configured to display a user setting dialog screen, the user setting dialog screen including at least a user shuffle setting control for enabling a user to set a user shuffle setting; a user input device configured to facilitate user input pertaining to a user shuffle setting, the user shuffle setting determining whether repeats of the media items are more or less likely; and a processing device configured to at least (i) determine a shuffle parameter based on the user shuffle setting; (ii) categorize the media items with the group of media items; and (iii) categorically shuffle the categorized media items with the group of media items based on the shuffle parameter.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 5A-5D are exemplary graphical user interfaces (i.e., screens shots) depicting a group of media items being shuffled in accordance with different shuffle settings according to one representative example of one embodiment of the invention.

DETAILED DESCRIPTION OF THE INVENTION

The invention pertains to techniques and graphical user interfaces that enable users to shuffle a group of media items in accordance with categories associated with the media items. According to one aspect, techniques can operate to categorically shuffle media items having categories associated therewith. According to another aspect, a user interface control can be graphically presented to a user to assist the user in selecting a shuffle setting. The shuffle setting provided by the user affects the nature of the shuffle. For example, the shuffle setting can impact the likelihood that two adjacent media items in the group of media items will be from the same one or more categories following the shuffle.

The invention is well suited for use with a media management application program that operates on a computing device, such as a personal computer. The media management application program can, among other things, maintain groups (e.g., libraries or playlists) of media items, search or browse through media items in such groups, shuffle through media items in such groups, present (e.g., play) media items, etc.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
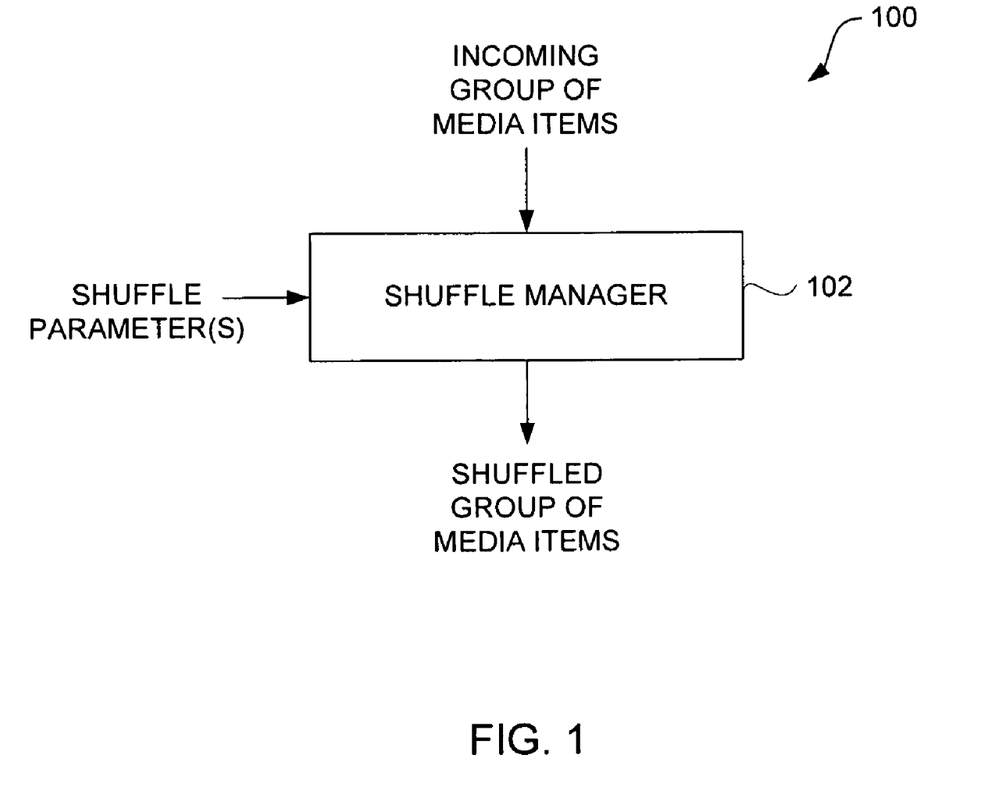
FIG. 1 is a block diagram of a shuffle management system according to one embodiment of the invention.

FIG. 1 is a block diagram of a shuffle management system 100 according to one embodiment of the invention. The shuffle management system 100 can be provided within a computing device, such as a personal computer (stationary or portable) or a portable media device (e.g., portable media player). The shuffle management system 100 includes a shuffle manager 102. The shuffle manager 102 operates to perform a shuffle operation, more particularly, a categorical shuffle. More specifically, the shuffle manager 200 receives an incoming group of media items. In general, the incoming group of media items can pertain to a list of media items, such as a list of songs. For example, the group of media items can pertain to playlist or a library of songs. The shuffle manager 102 also receives one or more shuffle parameters. The shuffle parameters are typically provided by a user of the computing device. The one or more shuffle parameters influence the manner in which the shuffle manager 102 performs the shuffle operation. The shuffle manager 102 operates to shuffle the incoming group of media items in accordance with the one or more shuffle parameters. The result of the shuffle operation is then output by the shuffle manager 102 as a shuffled group of media items.

Figure 2:
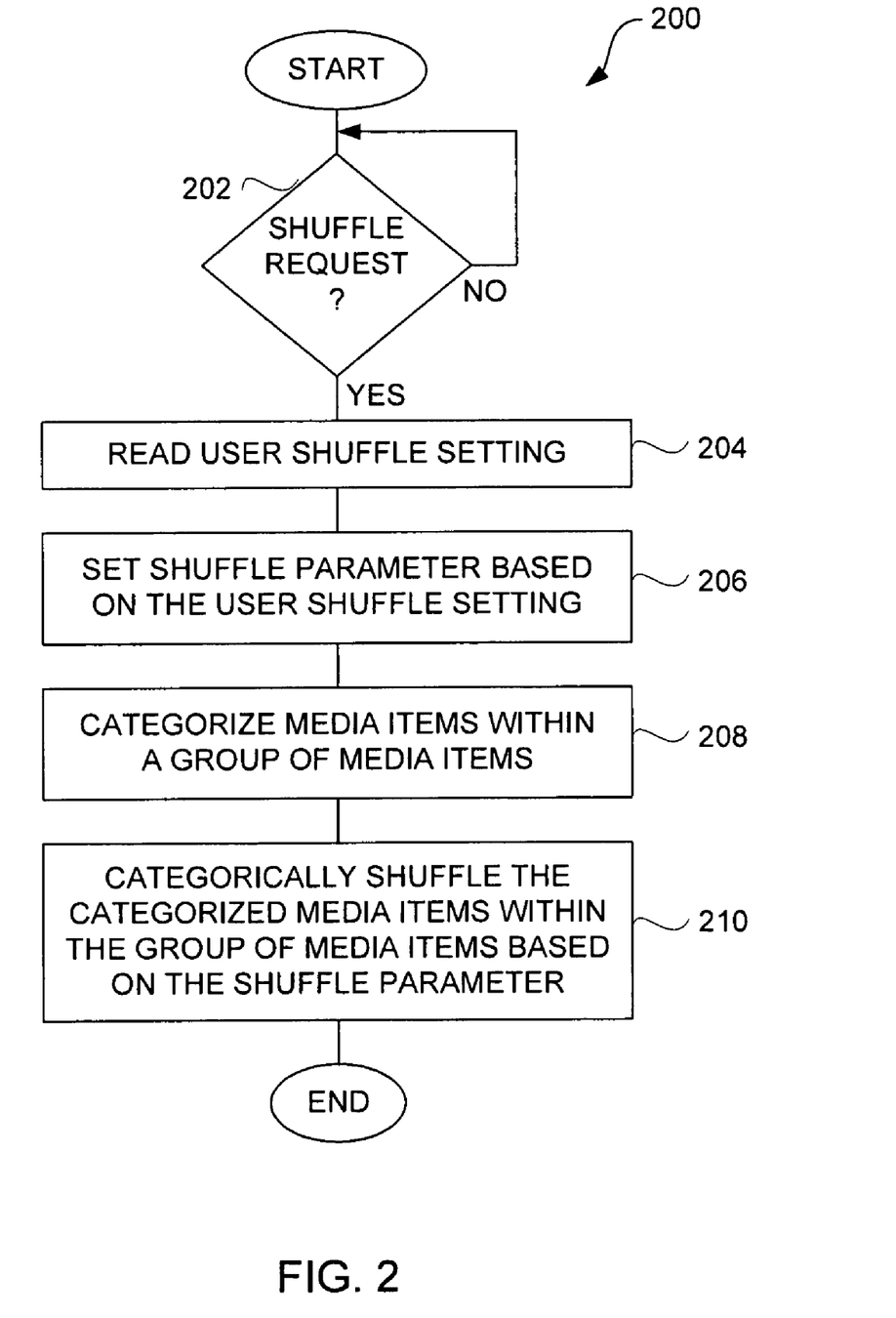
FIG. 2 is a flow diagram of a categorical shuffle process according to one embodiment of the invention.

FIG. 2 is a flow diagram of a categorical shuffle process 200 according to one embodiment of the invention. The categorical shuffle process 200 serves to shuffle media items within a group of media items. The categorical shuffle process 200 is, for example, performed by a computing device, such as a personal computer or a portable media player. In one embodiment, the categorical shuffle process 200 is processing associated with a media management application that operates on a computing device. As an example, the categorical shuffle process 200 can be performed by the shuffle manager 102 illustrated in FIG. 1.

The categorical shuffle process 200 begins with a decision 202. The decision 202 determines whether a shuffle request has been received. Here, the shuffle request can be received by the computing device as a result of a user action (e.g., a user request) or as a result of being automatically requested (e.g., by the media management application). In any case, when the decision 202 determines that a shuffle request has not been received, the categorical shuffle process 200 awaits such a request. In other words, the categorical shuffle process 200 is effectively invoked once a shuffle request has been issued.

Once the decision 202 determines that a shuffle request has been received, a user shuffle setting is read 204. The user shuffle setting is provided by a user of the computing device that performs the categorical shuffle process 200. The user shuffle setting can be provided by the user in real-time, or can be previously provided and stored within the computing device. After the user shuffle setting is read 204, a shuffle parameter is set 206 based on the user shuffle setting.

After the shuffle parameter has been sent 206, media items within the group of media items are categorized 208. The categorization of the media items simply associates the media items with one or more categories. The categories for use with the media items can vary with the type of media items. For example, when the media items are songs, exemplary categories can include any of artist, album, genre, composer, ratings, tempo, tone, key, etc.

Next, the categorized media items within the group of media items are categorically shuffled 210 based on the shuffle parameter. Following the block 210, the media items within the group of media items have been categorically shuffled; therefore, the categorical shuffle process 200 is complete and ends.

It should be understood that the categorical shuffle process 200 can utilize a plurality of user shuffle settings to set one or more shuffle parameters. Typically, the media items to be shuffled by the categorical shuffle process 200 are associated with one or more categories. In one embodiment, the number of shuffle parameters can be as large as the number of categories.

Figure 3A:
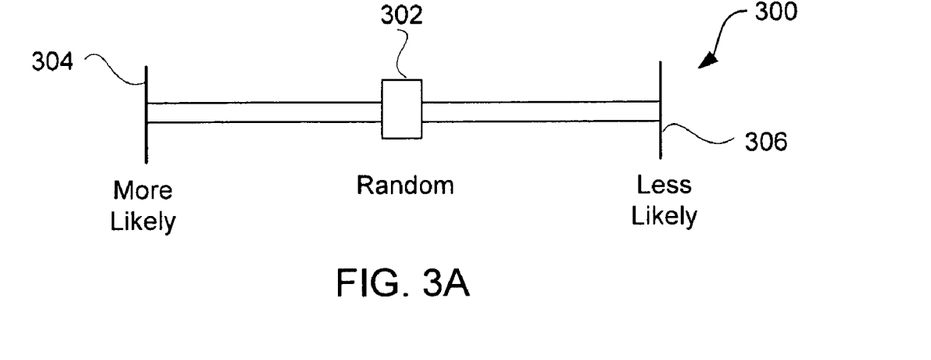
FIGS. 3A-3C are diagrams of exemplary user interface controls according to different embodiments of the invention.
Figure 3B:
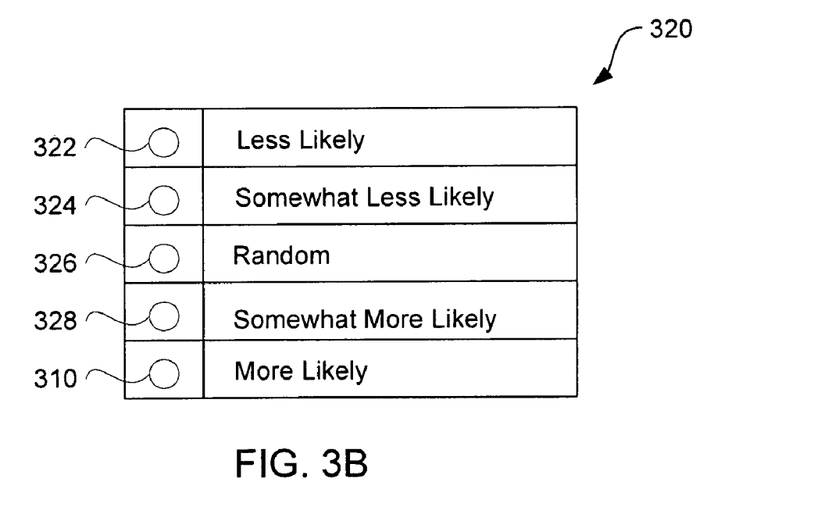
Figure 3C:
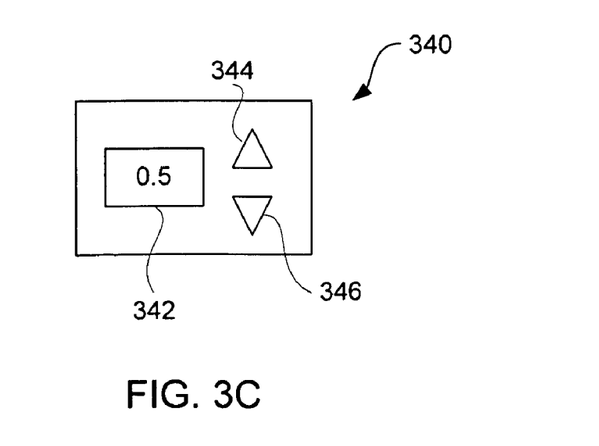

FIGS. 3A-3C are diagrams of exemplary user interface controls according to different embodiments of the invention. In general, the user interface controls are used to enable a user of a media management application to input a shuffle setting to influence a shuffle operation.

FIG. 3A is a diagram of a slider control 300 according to one embodiment of the invention. The slider control 300 includes a slider 302 that can be grabbed and slid by a user. When the slider 302 is slid to the far left endpoint 304, the shuffle setting corresponds to a user's desire to make "repeats" more likely. On the other hand, when the slider 302 is slid to the far right endpoint 306, the shuffle setting corresponds to a user's desire to make "repeats" less likely. Also, the slider 302 can be placed in the middle between the endpoints 304 and 306 to signal a user desire to utilize random shuffle. The slider 302 can also be placed anywhere between a center and either endpoints 304 and 306 for scaling the user's desire. Accordingly, the shuffle setting influences whether "repeats" are to be more or less likely then random.

A "repeat" occurs when, following a shuffle operation, adjacent media items (e.g., songs) are from the same one or more categories. In the case where the media items being shuffled are songs, a "repeat" can in one embodiment correspond to adjacent songs by the same artist or album.

FIG. 3B is a diagram of a selector control 320 according to one embodiment of the invention. The selector control 320 includes a plurality of selectable buttons 322-330 that are display and capable of being selected. A user can select any one of the selectable buttons 322-330 to indicate a desired shuffle setting. The selectable button 322 corresponds to a "Less Likely" denotation, meaning "repeats" are less likely than random. The selectable button 324 corresponds to a "Somewhat Less Likely" denotation, meaning "repeats" are somewhat less likely than random. The selectable button 326 corresponds to a "Random" denotation, meaning "repeats" are random. The selectable button 328 corresponds to a "Somewhat More Likely" denotation, meaning "repeats" are somewhat more likely than random. The selectable button 330 corresponds to a "More Likely" denotation, meaning "repeats" are more likely than random.

FIG. 3C is a diagram of a numerical control 340 according to one embodiment of the invention. The numerical control 340 includes a numerical read-out 342, an up arrow 344, and a down arrow 346. As shown in FIG. 3C, the value 0.5 is displayed in the numerical read-out 342. In one embodiment, the value 0.5 represents random and the numerical range for the shuffle setting is between 0.0 and 1.0. The numerical value greater than or equal to 0.0 and less than 0.5 represents a situation where "repeats" are made less likely than random. The numerical value less than or equal to 1.0 and greater than 0.5 represents a situation where "repeats" are made more random.

Figure 4:
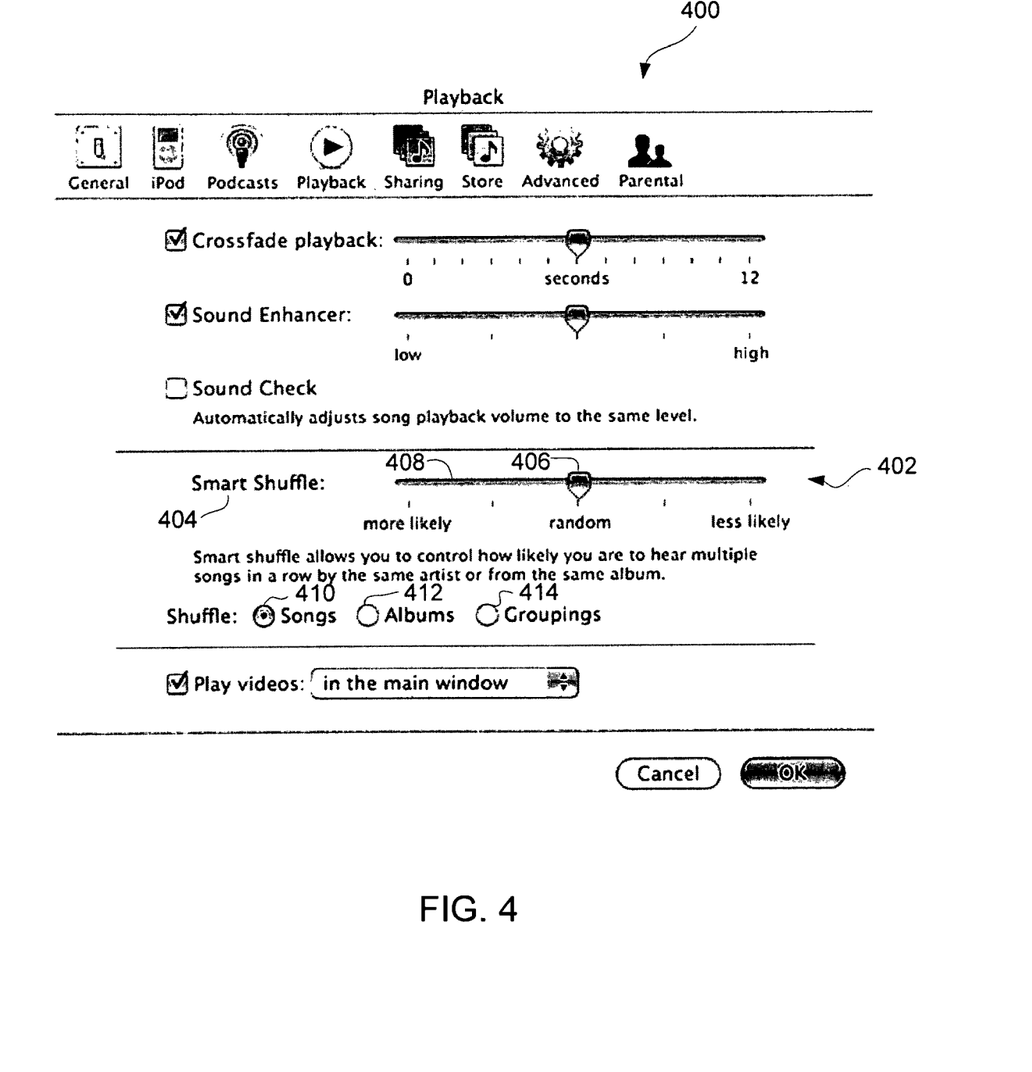
FIG. 4 is a screen shot of a playback settings window according to one embodiment of the invention.

FIG. 4 is a screen shot of a playback settings window 400 according to one embodiment of the invention. The playback settings window 400 can assist a user in setting various playback options. The playback settings include crossfade, sound, shuffle, and video options. Of particular interest is a slider control 402 having a label 404 denoted "Smart Shuffle". The slider control 402 includes a slider 406 that can be slid through user interaction along a bar 408. The slider control 402 operates to enable a user to provide a shuffle setting. The slider control 402 operates similarly to the slider control 300 illustrated in FIG. 3A. When the slider 406 is slid along the bar 408 to the left, the shuffle setting corresponds to a user's desire to make "repeats" more likely. On the other hand, when the slider 406 is slid to the right, the shuffle setting corresponds to a user's desire to make "repeats" less likely. Also, the slider 406 can be placed in the middle between of the bar 408 to signal a user's desire to utilize random shuffle.

Additionally, in FIG. 4, the playback settings window 400 includes shuffle context settings. The shuffle context settings include a select button 410 corresponding to a "Songs" shuffle context, a select button 412 corresponding to a "Albums" shuffle context, and a select button 414 corresponding to a "Groupings" shuffle context. With the "Songs" shuffle context, a shuffle operation operates to shuffle all songs together. With the "Albums" shuffle context, a shuffle operation shuffles all albums, but all songs with an album will remain in order. With the "Groupings" shuffle context, a shuffle operation operates to shuffle all songs except those having a common work (e.g., different movements, tempos or arrangements of a song) which will remain in order. For example, the following three classical songs—"Piano Concerto No. 19 In F, KV 459: Allegro Vivace," "Piano Concerto No. 19 In F, KV 459: Allegretto," and "Piano Concerto No. 19 In F, KV 459: Allegro Assai."—would be consider a common work and thus would remain together in order.

FIGS. 5A-5D are exemplary graphical user interfaces (i.e., screens shots) depicting a group of media items being shuffled in accordance with different shuffle settings according to one representative example of one embodiment of the invention.

Figure 5A:
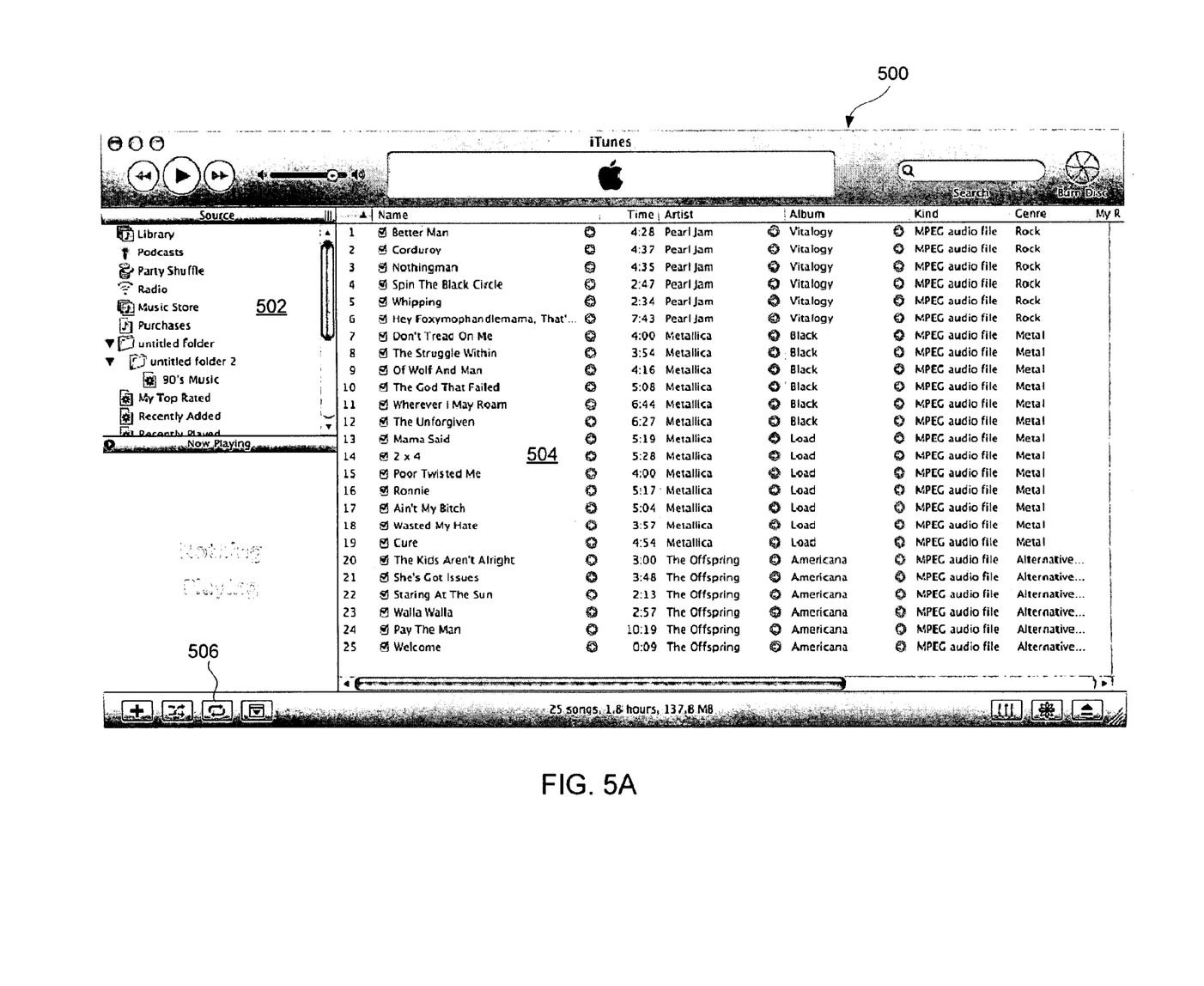

FIG. 5A is a screen shot of a media source screen 500 according to one embodiment of the invention. As an example, the media source screen 500 can be produced by an application program, such as a media management application program, operating on a client device, such as a personal computer.

The media source screen 500 includes a source portion (region) 502 and a track listing portion (region) 504. The source portion 502 identifies of a source for media items. The sources can include a library, a playlist, a folder, etc. The track listing portion 504 provides a listing of media items (e.g., audio tracks) associated with the selected source. In this example, the track listing portion 504 contains a list of twenty-five (25) songs that are associated with the selected source. In this initial list of songs, the songs are ordered by artist and album. The list of songs are from a total of three artists and four albums.

From this arrangement as shown in FIG. 5A, a user can select a shuffle control 506 (e.g., icon) to initiate another shuffle operation of the songs in the list of songs in the media track listing portion 504.

FIG. 5B is a screen shot of the media source window 500' after the shuffle operation has been performed on the list of songs illustrated in the media track listing portion 504 of FIG. 5A. For this example, it is assumed that a shuffle setting requests a "random" setting. Accordingly, the list of songs in the media track listing portion 504 are the same twenty-five (25) songs that were listed in FIG. 5A; however, the order of the songs within the list of songs is different. There are several "repeats" present following the "random" shuffle. Song 5 is a repeated artist from song 4. Song 8 is a repeated artist and album from song 7. Songs 11, 13 and 20 are also repeated artists and albums. Hence, one could say such represents about 25% repeats.

From this arrangement as shown in FIG. 5B, a user can select the shuffle control 506 (e.g., icon) to initiate another shuffle operation of the songs in the list of songs in the media track listing portion 504.

Figure 5C:
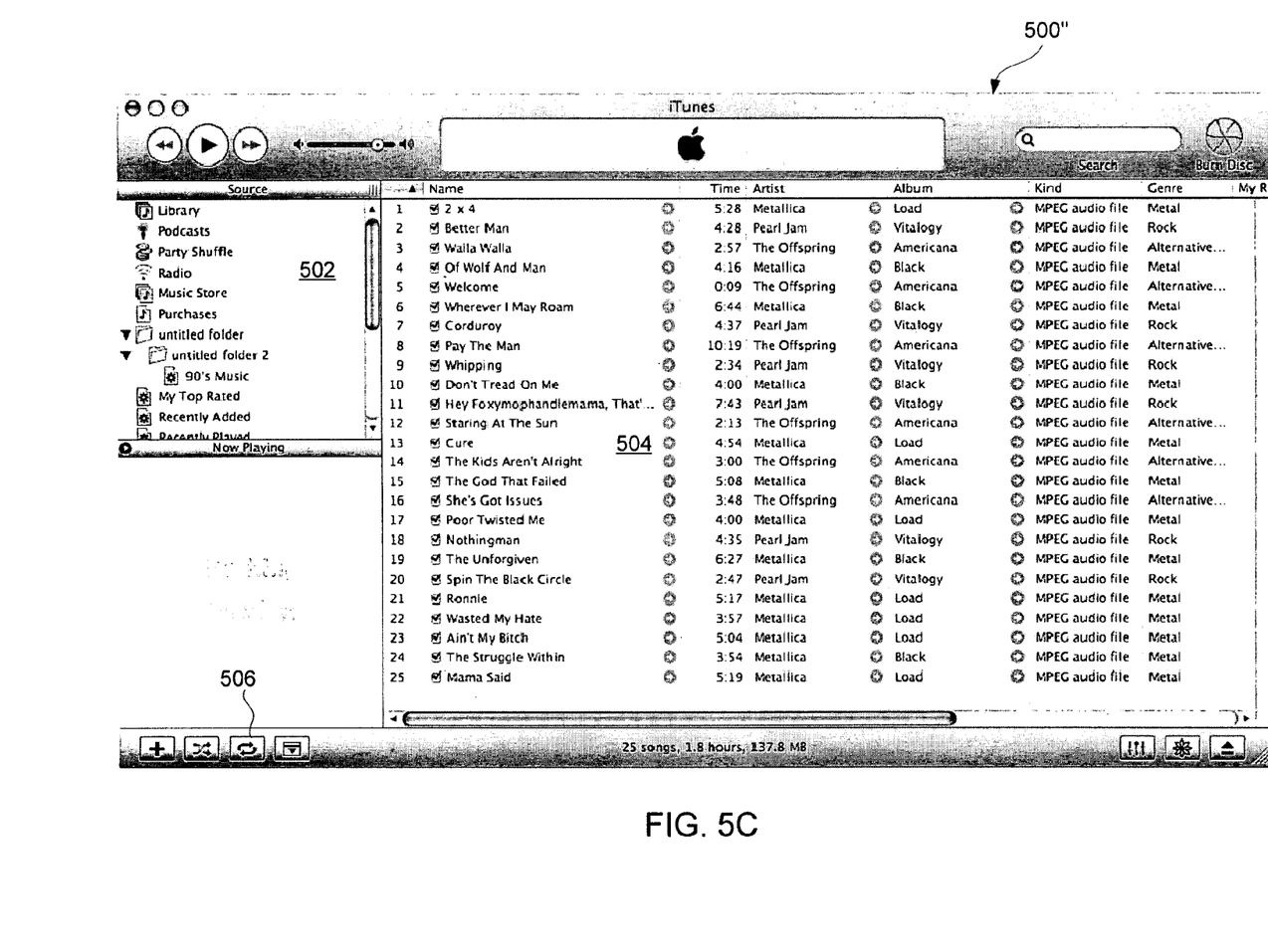

FIG. 5C is a screen shot of the media source window 500" after the shuffle operation has been performed on the list of songs illustrated in the media track listing portion 504 of FIG. 5B. For this example, it is assumed that a shuffle setting requests a "less likely" setting. Accordingly, the list of songs in the media track listing portion 504 are the same twenty-five (25) songs that were listed in FIG. 5B; however, the order of the songs within the list of songs is different. There are a few "repeats" present following the "less likely" shuffle. Songs 22 and 23 are repeated artist and album from song 21. Songs 24 and 25 are repeated artist but different albums. Hence, one could say such represents about 16% repeats. These "repeats" result at the end of the list of songs because of the limited number of different artists and albums within the list of songs. Hence, with greater numbers of artists and albums within the list of songs, the percentage of repeats would be substantially lower the 16%.

From this arrangement as shown in FIG. 5C, a user can select a shuffle control 506 (e.g., icon) to initiate another shuffle operation of the songs in the list of songs in the media track listing portion 504.

Figure 5D:
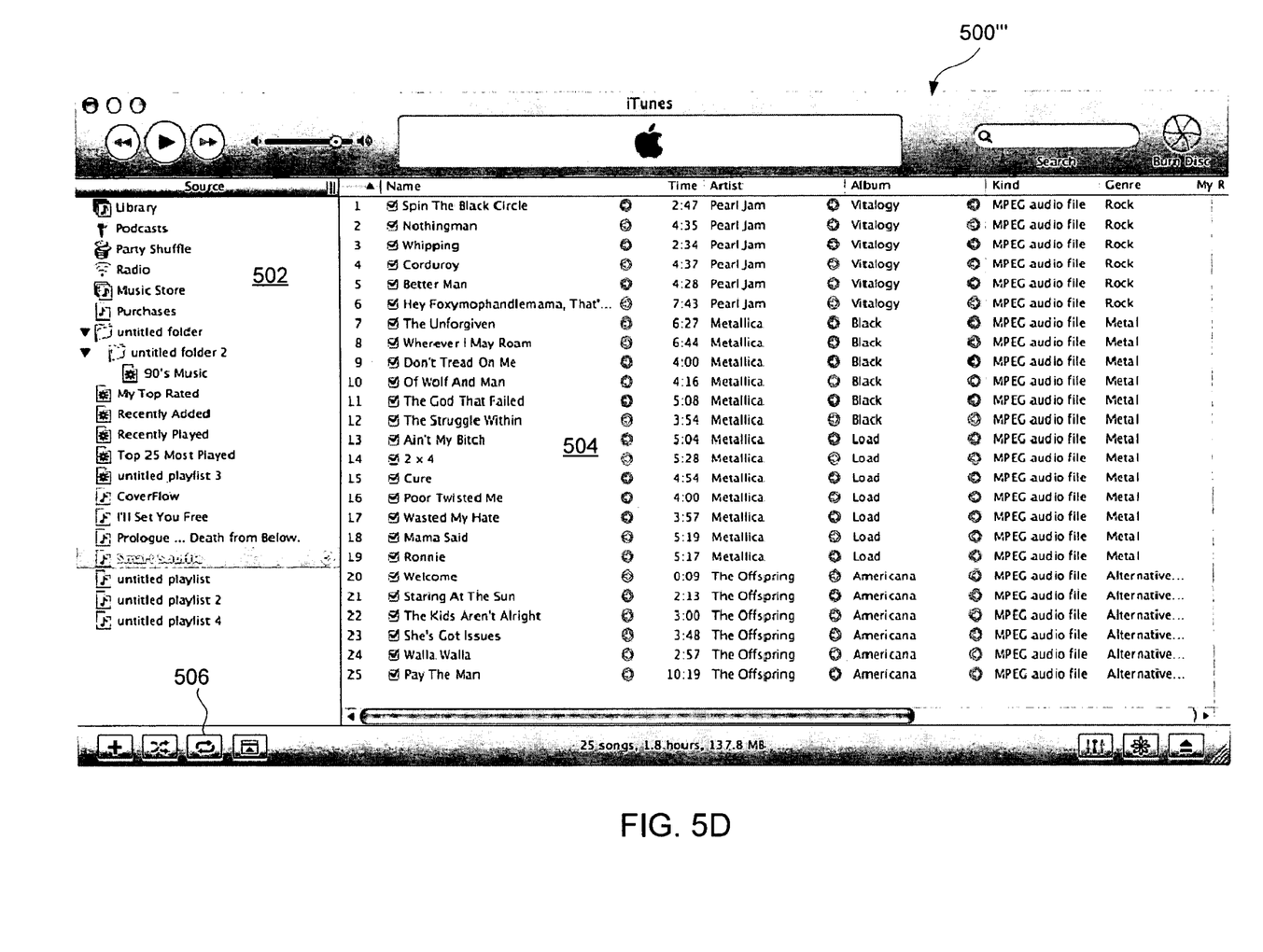

FIG. 5D is a screen shot of the media source window 500''' after the shuffle operation has been performed on the list of songs illustrated in the media track listing portion 504 of FIG. 5C. For this example, it is assumed that a shuffle setting requests a "more likely" setting. Accordingly, the list of songs in the media track listing portion 504 are the same twenty-five (25) songs that were listed in FIG. 5C; however, the order of the songs within the list of songs is different. There are a large number of "repeats" present following the "more likely" shuffle. Songs 2-6 are repeated artist and album from song 1. Songs 8-19 are repeated artist and/or album from song 7, of which 8-12 are repeated artist and album from song 7 and songs 14-19 are repeated artist and album from song 13. Songs 21-25 are repeated artist and album from song 20. Hence, one could say such represents about 88% repeats.

Figure 6:
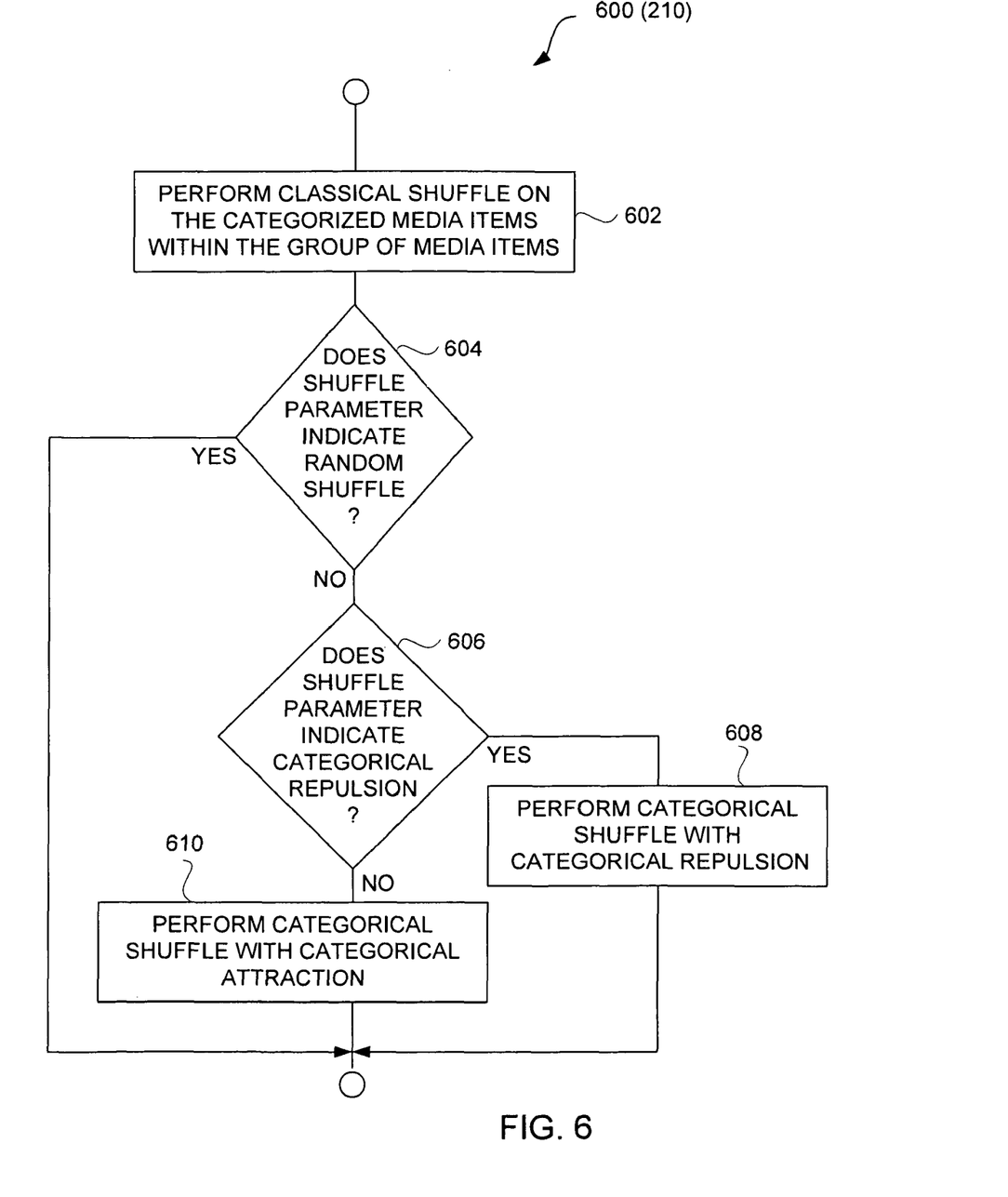
FIG. 6 is a flow diagram of a categorical shuffle process according to one embodiment of the invention.

FIG. 6 is a flow diagram of a categorical shuffle process 600 according to one embodiment of the invention. The categorical shuffle process 600 is, for example, processing performed by the block 210 of the categorical shuffle process 200 illustrated in FIG. 2, according to one implementation of the invention.

According to the categorical shuffle process 600, initially a classical shuffle one the categorized media items within the group of media items is performed 602. Next, a decision 604 determines whether the shuffle parameter indicates that a random shuffle is to be performed. When the decision 604 determines that a random shuffle is to be performed, the categorical shuffle process 600 ends with the shuffle operation having been performed by way of the classical shuffle.

On the other hand, when the decision 604 determines that a random shuffle is not to be performed, a decision 606 determines whether the shuffle parameter indicates categorical repulsion should be applied. When the decision 606 determines that the shuffle parameter does indicate that categorical repulsion should be applied, a categorical shuffle is performed 608 with categorical repulsion. Alternatively, when the decision 606 determines that the shuffle parameter indicates categorical repulsion should not be applied, then a categorical shuffle is performed 610 with categorical attraction. Accordingly, in one embodiment, the shuffle parameter can also be referred to as a tunable attraction/repulsion parameter. Following the blocks 608 and 610 the categorical shuffle process 600 ends.

In the case where more than one shuffle parameter is being used (or where a single shuffle parameter is being used for multiple categories), the categorical shuffle process 600 can be repeated for different categories. Hence, the shuffle operation can be performed on a category basis by being used in a recursive manner.

Perfect shuffling of N items via O(N) random swaps is a well known, simple procedure. However, if one wishes to invoke a constraint—such as categorical attraction/repulsion (i.e. clumps of consecutive categories encouraged/avoided, respectively)—the shuffling is more difficult. Disclosed is a fast, low memory algorithm for categorical shuffle with a tunable real parameter R in the interval [0, 1], with capability for total attraction (R=0), maximal repulsion (R=1), and a reasonable, monotonic tracking of repeat-expectation values for intermediate R. Subcategories can further be processed via recursive calling of the algorithm with one or more additional parameters.

Shuffling of N objects $\{t_0, t_1, \ldots, t_{N-1}\}$ is classically and easily solved via a function rani(j, k) that returns a uniformly random integer in the interval [j, k] inclusive. An algorithm to provide a classical shuffle is first described. For N objects $\{t_0, \ldots, t_{N-1}\}$ this (one-loop) algorithm performs a shuffle based on a swap(j, k) procedure that swaps $t_j$, $t_k$. The classical shuffle algorithm is:

for (j ∈[0, N−2])swap(j, rani(j, N−1));

Note the important facet that one does not swap object j with a random object strictly to the right of j. Instead, to assure statistical purity of the shuffle one can include j itself in the random swap possibilities, because, of course, there is a chance that an object should not move at all; for example, there needs to be a probability 1/N that the 0th object remain at position 0, and so on.

The objective of a categorical shuffle is to shuffle in such a way that categories are either clustered or separated in a certain sense. By "categories" it is meant that there are two lists:

$\{t_0, t_1, \ldots, t_{N-1}\}$
$\{c_0, c_1, \ldots, c_{N-1}\}$ where $c_j$ is generally the category of object $t_j$. The nomenclature follows the rules $0 \leq t_j < N$,
$0 \leq c_j \leq \bar{c}$, where $\bar{c}$ is the maximum category integer. Clearly, the number of different categories cannot exceed N, which means the category integers can always be rescaled so that $\bar{c} < N$. Next, the category histogram can be defined as the collection of counts $h_c := \#\{c_j = c\}$, so that $$\sum_{c=0}^{\bar{c}} h_c = N.$$

Consider the following example. Let the objects and their respective categories be $\{t_0, t_1, \ldots\} = \{0, 1, 2, 3, 4, 5, 6, 7\}$,
$\{c_0, c_1, \ldots\} = \{3, 3, 1, 2, 0, 1, 1, 3\}$, so in this case we have N=8,
$\bar{c}$=3,
$\{h_0, h_1, h_2, h_3\} = \{1, 3, 1, 3\}$.

Now, for general lists of objects and their respective categories, let there be chosen a real "repulsion" parameter R∈[0, 1] and assume special cases such as R=0: Categories will be completely clumped in the shuffle;
0<R<½: Clumping is statistically expected but depends on R;
R=½: This will be the default, classical-shuffle algorithm so categories are ignored;
½<R<1: Avoidance of clumps is statistically expected but depends on R;
R=1: Categorical clumps will be avoided as much as possible in the shuffle;

and furthermore, these categorical effects can be determined in some reasonable, smooth, monotonic manner as the repulsion parameter R is tuned continuously from 0 to 1.

In designing a categorical-shuffle algorithm with R-dependency, the desired behavior is provided in the previous example is as follows:

For the previous example N=8 and
$\{t_0, t_1, \ldots\} = \{0, 1, 2, 3, 4, 5, 6, 7\}$,
$\{c_0, c_1, \ldots\} = \{3, 3, 1, 2, 0, 1, 1, 3\}$,
the desired results of the algorithm are:

For R=0: Totally clustered categories, but with random category order, as in
   {$t_0, t_1, \ldots$}={1, 0, 7, 6, 2, 5, 3, 4},
   {$c_0, c_1, \ldots$}={3, 3, 3, 1, 1, 1, 2, 0};
For R=0.5: Pure-random shuffle;
For R=1.0: Separated categories, as in:
   {$t_0, t_1, \ldots$}={1, 0, 7, 6, 2, 5, 3, 4},
   {$c_0, c_1, \ldots$}={1, 3, 1, 3, 0, 1, 2, 1};
And for other R, some reasonable continuous behavior according to the above discussion of expectations.

An algorithm to perform a categorical shuffle according to one embodiment is presented below. Given a tuning parameter R∈[0,1], the algorithm shuffles with total clumping (R=0), pure-random character (R=½), or avoidance of adjacent like categories (R=1), with other R in the unit interval causing reasonable, monotonic behavior of the expected number of repeat categories. The inputs to the algorithm are object and category lists t, c respectively, each of length N.

Exemplary Algorithm:
0) Establish functions: rani(j, k) for random integer in [U, k], and vector_swap(t, c, j, k) for swapping respective pairs $t_j$, $t_k$ and the corresponding $c_j$, $c_k$ simultaneously;
1) If (R==0.5) Shuffle objects/categories in pure-random, classical fashion and return;
2) If (R<0.5) {Cluster objects/categories totally, but with random order of categories; Do classical shuffle, except perform each internal vector_swap( ) with probability 2R; Recurse, applying next criteria to each group of categories; Return};
3) If (R>0.5) Recurse, applying next criteria to entire list; Construct the histogram h of category populations; if # categories==1, Return
4) vector_swap(t, c, 0, rani(0,N−1)); //Swap a random object/category into position 0.
5) For (j ∈[1, N−2]){
   c'=$c_j$−1; //The previous category is c".
   k=rani (j, N−1);
   If ($h_{c'}$ is 0 or N−j) goto (6);
   p=(2-2R)$h_{c'}$/(N−j); //The modified probability of a repeat of c';
   With probability p, find new k≧j with category $c_k$=c';
   else find new k≧j of category $c_k$≠c';
6) vector_swap(t, c, j, k) and decrement $h_{c'}$; //Swap and update histogram.}
7) if last and second to last item are in same category, swap last item with any item in the list not from that category.

Such an algorithm can keep memory tightly controlled (only O($\bar{c}$) extra memory is required regardless of R, where "O" represent order in context of complexity/efficiency of an algorithm). The run time of the algorithm can also be reduced below the classical O($N^2$) (with enough work in step (5), O(N log N), i.e., pseudolinear in the length N should be achievable).

The algorithm can also accommodate more than one tuning parameter, such as two parameters, say R and S, and categories themselves can have subcategories. For example, object list t and category lists c and d, each of length N.
   t={3, 4, 7, 0, 6, . . . . },
   c={2, 2, 2, 1, . . . },
   d={0, 1, 2, 0, 1, . . . }.
In this example, the second category (d) shows three subcategories, the latter numbered 0, 1, 2. The parameter S determines the statistics for the d list.

The most direct way to use a second, subcategory parameter is to use the reentrant style of algorithm at the beginning of step (2), and before the classical shuffle, call the whole algorithm recursively on each string of consecutive clumped categories, passing the second parameter S.

Figure 7:
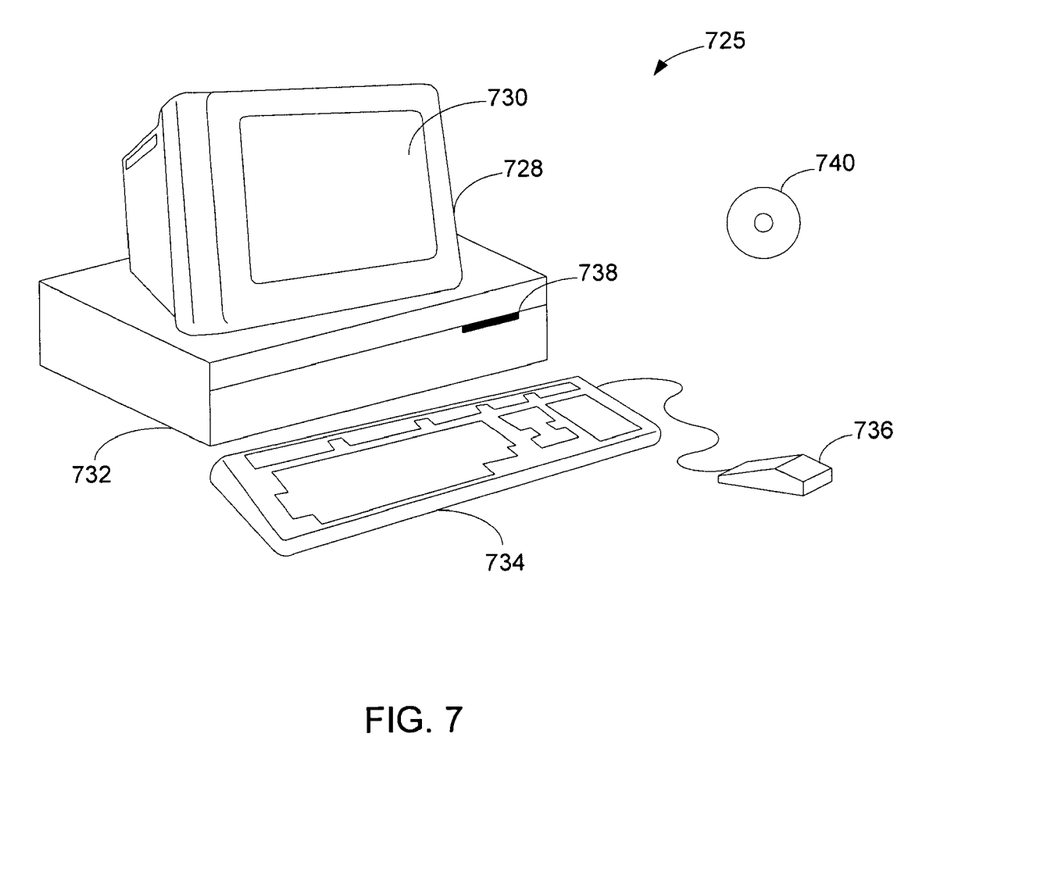
FIG. 7 shows an exemplary computer system suitable for use with the invention.

FIG. 7 shows an exemplary computer system 725 suitable for use with the invention. Computer system 725 includes a display monitor 728 having a single or multi-screen display 730 (or multiple displays), cabinet 732, keyboard 734, and mouse 736. Cabinet 732 houses a drive 738, such as a CD-ROM or floppy drive, system memory and a hard drive (not shown) which may be utilized to store and retrieve software programs incorporating computer code that implements the present invention, data for use with the invention, and the like. Although CD-ROM 740 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 725 is provided in the system memory, the hard drive, the CD-ROM 740 or other computer readable storage medium and serves to incorporate the computer code that implements the invention.

Although the media items (or media assets) of emphasis in several of the above embodiments were audio items (e.g., audio files, such as for songs), the media items are not limited to audio items. For example, the media items can alternatively pertain to video items (e.g., video files or movies), or image items (e.g., photos).

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a shuffle operation of a group of media items is tunable. Another advantage of the invention is that categorical shuffling can be efficiently and reliably performed in view of categories of media items. Still another aspect of the invention is that a user interface element can be presented to facilitated entry of user shuffle settings in a robust, user-friendly manner.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method operating on a computing system for shuffling media items in a group of media items, the computing system having a display device and a user input device, said method comprising:

displaying a user setting dialog screen on the display device, the user setting dialog screen including at least a user shuffle setting control for enabling a user to set a user shuffle setting;

obtaining a user shuffle setting from the user via the user input device, the user shuffle setting determining whether repeats of the media items are more or less likely;

determining a shuffle parameter based on the user shuffle setting;

categorizing the media items within the group of media items; and categorically shuffling the categorized media items within the group of media items based on the shuffle parameter.

2. A computer-implemented method as recited in claim 1, wherein the user shuffle setting affects the likelihood that media items from a common origin will be adjacent one another in a group of the media items following a shuffle operation.

3. A computer-implemented method as recited in claim 1, wherein the media items are songs, and wherein said categorizing associates one or more categories to each of the media items within the group of media items.

4. A computer-implemented method as recited in claim 1, wherein said shuffling comprises:
performing a classical shuffle operation on the media items within the group of media items to provide a classically shuffled group of the media items; and
thereafter performing a categorical shuffle operation on the classically shuffled group of the media items with either categorical repulsion or categorical attraction.

5. A computer-implemented method as recited in claim 4, wherein the categorical shuffle operation is performed with either categorical repulsion or categorical attraction depending on the shuffle parameter.

6. A computer-implemented method as recited in claim 5, wherein if the shuffle parameter is less than a predetermined value, then categorical repulsion is applied during the categorical shuffle operation.

7. A computer-implemented method as recited in claim 5, wherein if the shuffle parameter is greater than the predetermined value, then categorical attraction is applied during the categorical shuffle operation.

8. A computer-implemented method as recited in claim 1, wherein certain of the media items can be associated with a common work, and wherein the certain media items are maintained in sequence notwithstanding said shuffling.

9. A computer-implemented method as recited in claim 1,
wherein the media items are songs, each song being associated with an artist and an album, and
wherein the user shuffle setting affects the likelihood that songs from the same artist or from the same album will be adjacent one another in the group of media items following a shuffle operation.

10. A computer-implemented method as recited in claim 9, wherein said shuffling operates to shuffle the albums but maintains the songs of the album in order.

11. A computer-implemented method as recited in claim 9, wherein said shuffling operates to shuffle the songs but maintains the songs of a common work in order.

12. A computing system for shuffling media items in a group of media items, said computing system comprising:
means for obtaining a user shuffle setting provided by a user, the user shuffle setting determining whether repeats of the media items are more or less likely than random;

means for determining a shuffle parameter based on the user shuffle setting;
means for categorizing the media items within the group of media items; and
means for categorically shuffling the categorized media items within the group of media items based on the shuffle parameter.

13. A computing system configured to shuffle media items in a group of media items, said computing system comprising:
a display device for displaying a user setting dialog screen, the user setting dialog screen including at least a user shuffle setting control for enabling a user to set a user shuffle setting;
a user input device for facilitating user input pertaining to a user shuffle setting, the user shuffle setting determining whether repeats of the media items are more or less likely; and
a processing device for operating at least (i) determine a shuffle parameter based on the user shuffle setting; (ii) categorize the media items with the group of media items; and (iii) categorically shuffle the categorized media items with the group of media items based on the shuffle parameter.

14. A computing system as recited in claim 13, wherein the user shuffle setting control is one of a slider control, a selector control and a button control.

15. A computing system as recited in claim 13, wherein the user shuffle setting control comprises a slider control.

16. A computing system as recited in claim 13, wherein the user shuffle setting affects the likelihood that media items from a common origin will be adjacent one another in a group of the media items following a shuffle operation.

17. A computing system as recited in claim 13, wherein the media items are songs, and wherein the categorization of the media items associates one or more categories to each of the media items within the group of media items.

18. A computing system as recited in claim 13, wherein the shuffling by said processing device comprises: (i) a classical shuffle operation on the media items within the group of media items to provide a classically shuffled group of the media items; and (ii) a categorical shuffle operation on the classically shuffled group of the media items with either categorical repulsion or categorical attraction.

19. A computing system as recited in claim 13, wherein certain of the media items can be associated with a common work, and wherein the certain media items are maintained in sequence notwithstanding the shuffling by said shuffling device.

20. A computing system as recited in claim 13,
wherein the media items are songs, each song being associated with an artist and an album, and
wherein the user shuffle setting affects the likelihood that songs from the same artist or from the same album will be adjacent one another in the group of media items following a shuffle operation.

21. A computing system as recited in claim 20, wherein the shuffling by said shuffling device operates to shuffle the albums but maintains the songs of the album in order.

22. A computing system as recited in claim 20, wherein the shuffling by said shuffling device operates to shuffle the songs but maintains the songs of a common work in order.

* * * * *